P. C. LEWIS.
Agricultural Syringe.
No. 213,050.  Patented Mar. 11, 1879.
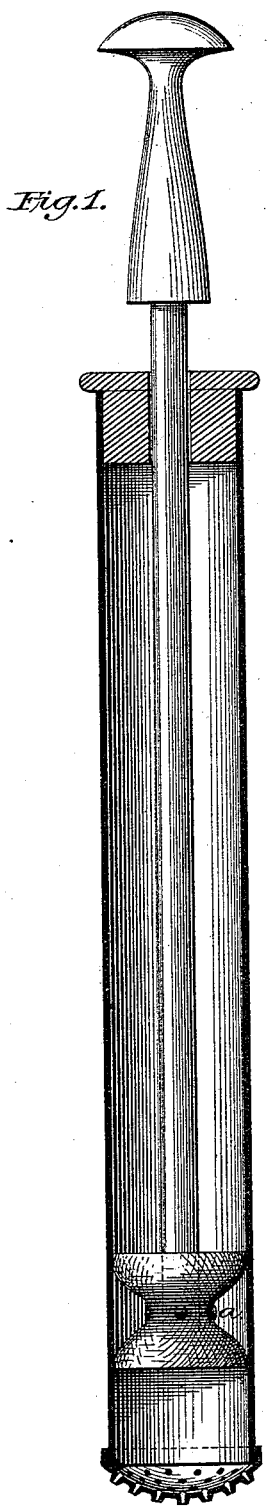
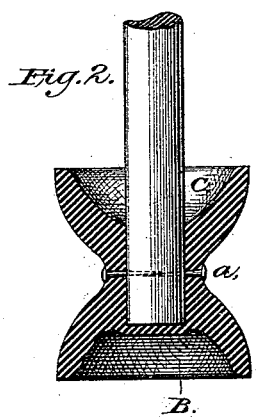
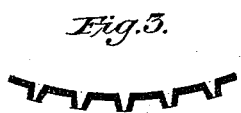
WITNESSES
John A. Ellis
C. H. Bates
Pearl C. Lewis
INVENTOR
by Geo. A. Sawyer
ATTORNEY

United States Patent Office.

PEARL C. LEWIS, OF CATSKILL, NEW YORK.

IMPROVEMENT IN AGRICULTURAL SYRINGES.

Specification forming part of Letters Patent No. 213,050, dated March 11, 1879; application filed June 26, 1878.

*To all whom it may concern:*

Be it known that I, PEARL C. LEWIS, of Catskill, State of New York, have invented certain new and useful Improvements in Agricultural Syringes; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

In the drawings, Figure 1 is a sectional view of my syringe. Fig. 2 is a section of the piston. Fig. 3 is a section of a portion of the rose.

The object of this invention is to furnish an improved syringe useful for all general purposes, but especially adapted as an agricultural syringe for throwing a preparation of paris-green or other prepared fluid on potato-vines, currant and rose bushes, &c., as an exterminator of potato-bugs, currant-worms, rose-bugs, and other injurious insects. For this purpose it is desirable that the poisoned fluid should be divided as minutely as possible and should reach the vines in the form of spray, because in this state it not only more effectually covers the leaves, but it also lies better and does not drop off as it would do when formed in large drops.

This object I accomplish by perforating the rose of the syringe with as many small holes and as close together as the surface of the rose permits, the holes being punched from the inside with a tapering or conical pointed punch, by which the metal around the holes is elongated more or less in the form of a conical tube, as shown in Fig. 3, and through which the fluid when forced by the plunger issues in such fine streams that they are not only prevented from commingling, but almost immediately after leaving the rose they divide into such minute drops as to reach the plants at the distance of a few feet in the form of the finest spray.

I am aware that on the rose in common use on watering-pots there is more or less "burr" left by the action of the punch; but in the rose, as I have here described it, this burr is developed into a little tube, with the result stated.

Another distinctive feature of my invention is the plunger or piston. This is made of rubber or other suitable material in the form of two cups, united at their base, with a cylindrical hole in the bottom of one, into which the piston-rod is secured. The hole does not go entirely through, but the piston-rod is inserted in it and held by two or three pins.

This tight piston admits of the use of light and cheap wood for the piston-rod, because, as there is no place for leakage of fluid through the piston, the rod is not exposed to alternations of dampness and dryness, which would make wood by swelling and shrinking otherwise objectionable for this purpose.

Fig. 2 shows the form of the piston in section.

A cylindrical piston with a circumferential groove, as at A, formed in it would possess in some degree the qualities of my device; but by forming the cup-shaped depressions in each end, as at B and C, the edges or rims of the cup so formed cling with great force to the inside of the syringe-tube, and while making the packing perfect, so that there can be no leakage, permits the easier and freer movement of the piston.

I am aware that double-cupped plungers or pistons and roses with conical holes formed in thick plates have been used heretofore.

Having thus described my invention, what I claim as new, and desire to secure by Letters Patent, is—

1. A syringe-rose formed of thin metal, the metal around the perforations being elongated or drawn into little conical tubes, substantially as described.

2. A syringe-piston formed of rubber or other suitable material, having a circumferential groove, and having cup-shaped depressions in each end and a socket passing partially through it for the reception of the piston-rod, substantially as described.

In testimony that I claim the foregoing as my own I affix my signature in presence of two witnesses.

PEARL CLINTON LEWIS.

Witnesses:
 GEO. L. COWLES,
 SYLVESTER B. SAGE.